(12) United States Patent
Shmueli et al.

(10) Patent No.: US 9,073,782 B2
(45) Date of Patent: Jul. 7, 2015

(54) SUBSTRATE HAVING A SELF CLEANING ANTI-REFLECTING COATING AND METHOD FOR ITS PREPARATION

(75) Inventors: Eitan Shmueli, Davie, FL (US); Amnon Leikovich, Tel Aviv (IL)

(73) Assignee: CLEANSUN ENERGY LTD., Jerusalem (IL)

( * ) Notice: Subject to any disclaimer, the term of this patent is extended or adjusted under 35 U.S.C. 154(b) by 848 days.

(21) Appl. No.: 13/144,166

(22) PCT Filed: Jan. 12, 2010

(86) PCT No.: PCT/IL2010/000027
§ 371 (c)(1),
(2), (4) Date: Oct. 3, 2011

(87) PCT Pub. No.: WO2010/079495
PCT Pub. Date: Jul. 15, 2010

(65) Prior Publication Data
US 2012/0009429 A1    Jan. 12, 2012

Related U.S. Application Data

(60) Provisional application No. 61/193,948, filed on Jan. 12, 2009.

(51) Int. Cl.
| | | |
|---|---|---|
| B32B 9/04 | (2006.01) |
| B05D 5/06 | (2006.01) |
| B05D 1/36 | (2006.01) |
| B05D 1/18 | (2006.01) |
| C03C 17/34 | (2006.01) |
| C09D 5/00 | (2006.01) |
| C09D 5/16 | (2006.01) |
| G02B 1/11 | (2015.01) |
| G02B 27/00 | (2006.01) |

(52) U.S. Cl.
CPC ....... *C03C 17/3411* (2013.01); *C03C 2217/425* (2013.01); *C03C 2217/732* (2013.01); *C03C 2217/76* (2013.01); *C09D 5/006* (2013.01); *C09D 5/1618* (2013.01); *G02B 1/11* (2013.01); *G02B 27/0006* (2013.01)

(58) Field of Classification Search
None
See application file for complete search history.

(56) References Cited

U.S. PATENT DOCUMENTS

| | | |
|---|---|---|
| 4,907,846 A | 3/1990 | Tustison et al. |
| 5,736,249 A | 4/1998 | Smith et al. |
| 5,993,910 A | 11/1999 | Carre et al. |
| 6,084,020 A | 7/2000 | Smith et al. |
| 6,120,849 A | 9/2000 | Smith et al. |
| 6,153,304 A | 11/2000 | Smith et al. |
| 6,291,070 B1 | 9/2001 | Arpac et al. |
| 6,420,020 B1 | 7/2002 | Yamazaki et al. |
| 6,524,664 B1 | 2/2003 | Hashimoto et al. |
| 6,531,215 B2 | 3/2003 | Yamazaki et al. |
| 6,627,319 B2 | 9/2003 | Jacquiod et al. |
| 6,811,856 B2 | 11/2004 | Nun et al. |
| 6,913,832 B2 | 7/2005 | Fan et al. |
| 2005/0186871 A1* | 8/2005 | Hockaday ........... 442/76 |
| 2006/0154044 A1 | 7/2006 | Yamada et al. |
| 2006/0275627 A1 | 12/2006 | Biteau et al. |
| 2007/0104922 A1 | 5/2007 | Zhai et al. |
| 2008/0002260 A1 | 1/2008 | Arrouy et al. |
| 2008/0038458 A1* | 2/2008 | Gemici et al. ........... 427/180 |
| 2008/0268229 A1* | 10/2008 | Lee et al. ........... 428/323 |
| 2010/0101649 A1 | 4/2010 | Huignard et al. |

FOREIGN PATENT DOCUMENTS

| | | |
|---|---|---|
| CN | 1872661 A | 12/2006 |
| DE | 10 2005 020 168 A1 | 11/2006 |
| DE | 10 2007 057 908 A1 | 6/2008 |
| FR | 2 739 392 A1 | 4/1997 |
| FR | 2 787 350 A1 | 6/2000 |
| FR | 2 908 406 A1 | 5/2008 |
| JP | 2006-162711 A | 6/2006 |
| WO | 2007/138215 A1 | 12/2007 |

OTHER PUBLICATIONS

Prevo, et al., "Assembly and characterization of colloid-based antireflective coatings on multicrystalline silicon solar cells", J. Mater. Chem., vol. 17, pp. 791-799, (2007).

* cited by examiner

*Primary Examiner* — Sheeba Ahmed
(74) *Attorney, Agent, or Firm* — Vorys, Sater, Seymour and Pease LLP; Susanne M. Hopkins; Ari G. Zytcer

(57) ABSTRACT

Provided is a substrate having a surface that is at least partially laminated with a coating that provides the surface both anti-reflective and self-cleaning properties. The coating is characterized by low refraction, a contact angle of at least 150° and a sliding angle of at most 10°, and includes two components: (i) an anti-reflecting coating (ARC) component and (ii) a self-cleaning coating (SCC) component. Also provided is a method for providing a substrate having a surface that is at least partially laminated with an anti-reflecting (AR) self-cleaning (SC) coating, the method including providing a substrate with at least one surface and applying a coating onto at least a part of the at least one surface, the coating including an ARC component and a SCC component.

9 Claims, 1 Drawing Sheet

US 9,073,782 B2

SUBSTRATE HAVING A SELF CLEANING ANTI-REFLECTING COATING AND METHOD FOR ITS PREPARATION

This is a National Phase Application filed under 35 U.S.C. §371 as a national stage of PCT/IL2010/000027, filed on Jan. 12, 2010, an application claiming the benefit under 35 U.S.C. §119(e) of U.S. Provisional Application No. 61/193,948, filed on Jan. 12, 2009, the content of each of which is hereby incorporated by reference in its entirety.

FIELD OF THE INVENTION

This invention relates to substrate coatings that exhibit both self-cleaning and anti-reflecting properties.

BACKGROUND OF THE INVENTION

Anti-Reflective Coatings (ARC)

The presence of a thin coating layer on a substrate provides two interfaces, the first is between the air and the thin layer and the second is between the thin layer and the substrate. Each of these interfaces reflects the light beam and generates a reflective beam. If the coating is a quarter wavelength thick and has an index of refraction less than that of the substrate then the two reflections are 180° out of phase and may therefore cancel each other by means of destructive interference.

The refractive index of a thin layer coating on a substrate should be substantially lower than that of the substrate (on to which it is applied) and its thickness should roughly be ¼ of the desired non-reflecting wavelength so as to obtain an anti-reflective coating. In the more complex cases, ARCs consist of a film comprising multiple thin alternating layers of contrasting refractive indexes.

Anti-reflection coatings are widely used in various applications such as display panels, solar cells and optical devices. Depending on the application, various types of ARCs may be used. Generally, there are at least two categories of ARCs available including, inter alia:

(i) A quarter-wavelength ARC that eliminates reflection of an essentially monochromatic wavelength.

As an example, Tustison et al. describe in U.S. Pat. No. 4,907,846 an ARC for an IR transparent optical element wherein the thickness of the anti-reflective layer is a quarter of the wavelength which must be maximally transmitted through the optical element.

(ii) Multiple coating (multicoating) configurations that accommodate a wide wavelength region of the spectrum.

As an example, Biteau; John et al. and Arrouy Frederic et al describe in, respectively, US patent applications publications Nos. 2006/275627 and US 2008/0002260 the use of anti reflecting multicoating.

Anti reflectance may be interfered by accumulation of dirt on its surface. The dirt on the surface of the ARC absorbs part of the light that otherwise would be transmitted trough the ARC and the substrate. This problem is especially intensified when the ARC has a polar surface which attracts dirt by electrostatic forces. Thus, frequent cleaning of the ARC is required to preserve the antireflective advantage it provides to the application.

Self Cleaning Surfaces or Coating (SCC)

Solid surfaces can be classified depending on their contact angle. A surface having a contact angle lager than 90° is considered hydrophobic, larger than 150° is considered ultra-hydrophobic; smaller than 90° is considered hydrophilic; and close to zero is considered ultra-hydrophilic Self cleaning surfaces exist in nature. Even when rising from muddy waters, the Lotus flower stays clean and untouched by pollution. To achieve this natural self-cleaning effect, the Lotus flower presents two basic features: (a) an ultra-hydrophobic surface chemistry, i.e. the Lotus has a contact angle greater than 150° such that water drops roll off and do not evaporate in the surface, thereby leaving no stains; and (b) a special nanometric morphology that acts like a "Fakir bed" reducing the contact area of the water drop to the surface, thus reducing the adhesion forces between them and allowing the water drop to slide down the Lotus leaf surface and clean the dirt upon it.

Hydrophobic coatings are mainly silicon or fluorinated coatings. Silicone coatings are mostly based on organosiloxane polymers (polysiloxanes). These are hybrid material composed of pendant organic groups attached to an inorganic siloxane backbone like polydimethylsiloxane (PDMS). Polysiloxanes typically achieve low free surface energy around 22-23 dyne/cm and contact angles ranging from 90° to 100°.

Fluorinated coatings have a very low surface energy (18 dyne/cm), are resistant to chemicals and present good thermal stability. Polytetrafluoroethylene (Teflon) coatings show contact angles close to 110°.

A few patents deal with the subject of hydrophobic surfaces. Smith, et al.; describe in U.S. Pat. Nos. 5,736,249 6,084,020; 6,120,849; and 6,153,304 non-sticky, non-fouling and ice-phobic hydrophobic coating systems for applications on inorganic, organic and metallic substrates, by means of two coating layers. The first layer is a fluoro-copolymer having good adhesion properties to the substrate and the second layer a siliconic polymer having hydrophobic properties, e.g. a surface energy in the range of 18-21 dynes/cm and contact angles in the range of 90°.

Arpac, et al. describe in U.S. Pat. No. 6,291,070, a method for producing nanostructured molded articles and layers by means of a wet chemical process comprising a free flowing composition containing solid nano-scaled inorganic particles having polymerizable and/or polycondensable organic hydrophobic surface groups. The molded articles are easy to clean.

Hashimoto, et al. describe in U.S. Pat. No. 6,524,664 a method for photo-excitation of a coating layer of a photocatalytic metal oxide in a manner that yields a mosaic of hydrophilic and hydrophobic regions in the exposed area. According to Hashimoto, et at the resulting surface is amphiphilic such that oil deposited on it can be easily removed by rinsing with water and water (or water-based liquids) deposited on it can be easily removed by rinsing with oil.

Yamazaki, et al. describe in U.S. Pat. Nos. 6,420,020, and 6,531,215 an antifogging article made of an antifogging film on a substrate. The antifogging film contains a first layer of a water absorbing organic polymer (acetalized polyvinyl alcohol) and a second layer of an inorganic water repellent silicon compound.

Nun, et al. describe in U.S. Pat. No. 6,811,856 a self-cleaning surface which has, an at least partially hydrophobic nanotextured surface structure made from elevations and depressions, where the elevations and depressions are formed by particles secured to the surface, wherein the elevations and/or depressions in the nanometer range (with average height from 20 to 500 nm and distance bellow 500 nm). The hydrophobic properties can be obtained by pretreatment of the particles with hydrophobic compounds (e.g. alkylsilanes and fluoroalkanes) or after the particles have been secured on to the substrate surface by dipping or spraying the surface with hydrophobic substances.

Fan et al. describe in U.S. Pat. No. 6,913,832 the production of nanostructured multilayered surfaces using organosilanes and silsesquioxanes.

Very few attempts have been made to combine antireflective with self cleaning properties. Rubner et. al. describe in US patent application publication Nos. 2008/268229 and 2007/104922 the combination of super hydrophilic coating with antireflective and antifogging properties.

Akira and Shinton in JP 2006/162711 disclose a composite material comprised of nanometer-sized titanium oxide particles that are bound to sub micron silicon dioxide particles having a combination of anti-reflective and self cleaning properties.

Finally, Brian G. Prevo, Emily W. Hon and Orlin D. Velev describe in J. Mater. Chem., 2007, 17, 791-799 the assembly of colloidal silica nanoparticles into antireflective coatings (ARCs) and onto polycrystalline silicon solar cells. The nanocoatings reduced the reflectance of the solar cells by approximately 10% across the near UV to near IR spectral range, which provided a 17% increase in the output power of the devices. The publication suggests modification of the silica based coatings by attachment of monolayers of fluorosilanes, which may make them superhydrophobic and/or self-cleaning

SUMMARY OF SOME NON LIMITING EMBODIMENTS

The present invention is based on the finding that an anti-reflecting, self cleaning coating can be obtained on substrate surfaces by applying onto the substrate a two component system comprising an anti-reflecting agent and a self cleaning agent.

The present invention thus provides, in accordance with a first of its aspects a substrate comprising a surface being at least partially laminated with a coating layer comprising a combination of an anti-reflecting coating (ARC) component and a self-cleaning coating (SCC) component, said coating layer being characterized by low refraction, a contact angle of at least 150° and a sliding angle of at most 10°.

In accordance with one embodiment, the ARC component comprises porous silica. The ARC component comprises at least one anti reflective agent. The anti reflective agent may be selected from the non-limiting group consisting of magnesium fluoride, aluminum fluoride, sodium fluoride, lithium fluoride, calcium fluoride, barium fluoride, strontium fluoride, cryolite, or chiolite.

In accordance with one embodiment, the SCC component comprises a nano structuring agent, a micro structuring agent or a combination of same. The combination may be an essentially homogenous dispersion of the nano structuring agent in a matrix formed by the micro structuring agent.

The nano structuring agent may be one or more agents selected from fluorosilane, fluoroalkylsilane, alkylsilane, or a hydrophobic-functionalized polyhedral oligomeric silsesquioxane (POSS) compound, as well as any other nano structuring agent known for the purpose of providing self cleaning surfaces. In one preferred embodiment, the nano structuring agent is fluorosilane.

The micro structuring agent may be one or more agent selected from colloidal silica, precipitated silica, unprecipitated silica, hydrophilic fumed silica, hydrophobic fumed silica, colloidal silica, treated colloidal silica, silicate, treated silicate, PTFE micropowder, metal nanopowder, metal oxide, inorganic nanopowder, oxide, sulfide, nanoclay, hyperbranched polymer or bohemite or any combinations thereof, as well as any other micro structuring agent known for the purpose of providing self cleaning surfaces. In one preferred embodiment, the micro structuring agent is colloidal silica.

The coating applied onto the substrate may be a multi layer coating, comprising a first layer proximal to the substrate's surface and at least one additional layer sandwiching, together with said substrate's surface, said first layer. In one embodiment, the first laminate comprises the ARC component; and the one additional laminate comprises said SCC component.

In accordance with one embodiment, the SCC component comprises an essentially homogenous dispersion of the nano structuring agent over a matrix formed by the micro structuring agent.

In one embodiment of the invention, the substrate comprises a surface being at least partially laminated with a first coating layer proximal to said surface, said first coating layer comprising mixture comprising an ARC component and a self-cleaning coating (SCC) component. In accordance with this embodiment, the ARC component preferably comprises a silica based sol gel and the self-cleaning coating (SCC) component preferably comprises a combination of colloidal silica and fluorosilane.

The present disclosure also provides a method for providing a substrate having a surface being at least partially laminated with an anti-reflecting (AR) self cleaning (SC) coating layer as defined in any one of claims 1 to 15, the method comprising:

(a) providing a substrate comprising at least one surface;
(b) applying onto at least part of said surface a coating comprising a combination of an ARC component and a SCC component to form the AR, SC coated substrate.

In accordance with one embodiment, the application of the coating comprises dipping said substrate in at least one coating solution comprising said ARC component, said SCC component or a combination of same.

Applying the coating may comprise, spraying, spreading, dipping or any other technique for providing a cover layer onto at least a portion of the substrate. It is noted that the layer may be a thin layer, having a average height of tens to hundreds of nanometers and at times even up to micrometers (several or tens of micrometers).

In accordance with one embodiment, the application of the coating comprises:

dipping at least once said substrate in a first coating solution comprising said ARC component and allowing said ARC component to dry so as to form an anti reflecting substrate;

dipping said anti reflecting substrate at least once in a second coating solution comprising said SCC component and allowing said ARC component to dry;

thereby obtaining said substrate having surface being at least partially laminated with an anti-reflecting (AR) self cleaning (SC) coating.

In accordance with one preferred embodiment of the invention, the method comprises washing said AR substrate at least once with a polar protic solvent prior to dipping said substrate at least once in the first coating solution. There are a variety of polar protic solvents that may be utilized for this purpose. In one embodiment, the washing solvent is ethanol.

In yet another embodiment, the method comprises applying an interface material onto said AR coating prior to dipping said substrate at least once in the first coating solution. The interface material is typically used for improving the contact between the AR coating and the SC coating. To this end, the intermediate layer may be an adhesive, such as a silane coupling agent.

Finally, the invention pertains to a package for providing a substrate as described above, the package comprising a first material comprising an anti-reflecting component; a second material comprising a self cleaning component, and instructions for applying said first material and said second material onto at least part of said surface to obtain said coating.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Figure 1A:
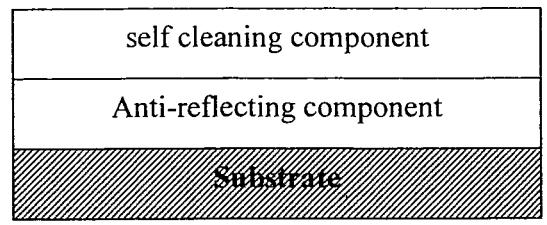
FIG. 1A-1C are schematic illustrations of a bilayer (FIG. 1A), a triple layer (FIG. 1B) or a single layer (FIG. 1C) anti-reflective self cleaning coating of a substrate.

The present invention is based on the finding that it is possible to coat a substrate with a combination of an anti-reflecting coating layer and self cleaning coating-layers and maintain both the anti-reflecting and self cleaning properties. Thus, the present invention provides a substrate coated with an anti-reflecting, self-cleaning coating. The anti-reflecting, self cleaning coating according to the invention may be referred, to at times, by the term "dual coating" comprising an anti reflecting component and a self cleaning component.

In accordance with the invention, the substrates a priori be transparent and require for their application high transmittance (light or radiation). Thus, in the context of the present invention the term "substrate" is used to denote a transparent material, such as, without being limited thereto, glass, quartz, indium tin oxide (ITO), transparent polymers such as polycarbonate (e.g. allyl diglycol carbonate (CR-39)), polymethylmetacrylate (PMMA), cyclic olefin polymers, polystyrenes, polyesters, polyethersulfone, polyimides and polyurethanes. In one embodiment, the substrate is an optical substrate. Non-transparent substrates may include, in the context of the present disclosure thin film solar panels/modules and luminescent coated collectors.

The self-cleaning property of the dual coating according to the invention is of particular importance with substrates having the tendency of getting dirty, e.g. by the deposition thereon of dirt, dust or any other particulate matter, which will thereby result in obscuring light from the substrate.

The interface between the substrate and the dual coating according to the present invention may be planar, such as with microscope slides, windows, solar cells/photoelectric cells, display panels, solar collectors etc., or have curvatures, such as with lenses, windshields, etc. Furthermore, the surface of the substrate in contact with the dual coating may be smooth or have a texture (e.g. some degree of roughness).

The anti-reflecting coating component may be any coating known in the art that when applied onto a substrate, reduces the reflectance of light by the substrate. In the context of the present invention, the term "anti-reflecting coating" or "ARC" is typically and without being limited thereto, a coating or a component of a coating (namely, a component of the dual coating) that when applied onto a substrate allows for at most 2% reflectance at the midrange wavelength of the spectrum and at most 8% in a spectral range around the midrange wavelength.

The ARC component may be of any type, including the single layer interference coating, typically comprising a single quarter-wave layer of material whose refractive index is about the square root of the substrate's refractive index. The ARC component may also be a multilayer coating, comprising of alternating layers of contrasting refractive index, whereby the layers' thickness is chosen to produce destructive interference in the beams reflected from the interfaces of the coated substrate and constructive interference in the corresponding transmitted beams. For example, by using alternating layers of a low-index material like silica or silica based compounds and a higher-index material it is possible to obtain reflectivities as low as 0.1% at a single wavelength.

Chemically, the ARC component may be prepared from variety of chemical materials. The selection of the ARC will depend on the type of substrate (the index value of the substrate), the wavelength or range of wavelengths, the thickness required, the type of ARC, namely, a single layer, multi layer, the medium (e.g. open air, water, etc.). Those versed in the art will know how to select the ARC component taking into consideration the above parameters as well as any other parameter known in the art and that may be needed for such determination. Typically, the ARC comprises a silica inorganic porous skeleton, having hydrophobic organic groups covalently linked therein. For the preparation of single interference ARC, it is preferable that the material selected has a low refractive index, typically below the refractive index of the substrate between 1.25-1.28. For the preparation of a multi layer ARC, it is preferable that a combination of materials be used, the combination comprising at least one material having a refractive index lower than that of the substrate and at least one other material having a refractive index above that of the substrate. Without being limited thereto, the ARC of the present disclosure is typically a single layer of low refractive index.

Low-refractive index layers may be formed from a variety of materials such as, silica based sol gel materials, fluoride composite (typically to improve refraction) or combinations of same. The fluoride composite may include, without being limited thereto, magnesium fluoride, aluminum fluoride, sodium fluoride, lithium fluoride, calcium fluoride, barium fluoride, strontium fluoride, cryolite, and chiolite, and/or combinations thereof. According to the present disclosure the ARC component comprises a silica ($SiO_2$) inorganic porous skeleton, having hydrophobic organic groups covalently linked therein. Without being limited thereto, the organic groups may be selected from the group consisting of C1-C8 alkyl, at times, C1-C4, however, preferably methyl or ethyl.

In one embodiment, the silica based ARC component is used in a single interference configuration coating and comprises a sol-gel material. Typically, sol gel material has a low refraction index. One way to achieve a lower index than that of $SiO_2$ is to introduce voids into the material. This can be done by combining silica with fluorides, such as those described above.

In accordance with the present disclosure, the coating also comprises a self cleaning (SC) component. The principle underlying the self-cleaning component is Lotus' natural self cleaning mechanism, known also as the Lotus effect. As described hereinbefore, self cleaning coatings are characterized by a contact angle of at least about 150° (≥150°), a sliding angle of at most about 10°) (≤10° and transmittance of above about 80%, at times above about 90%, preferably above 92% or even above 96% in a selected spectrum. In one embodiment, the dual coating is aimed at providing anti-reflectance in the visible light, UV and IR spectra (including NIR) of at least 92%, at times at least 96%, 98%, 99% and even up to 100% transmittance (0% reflectance).

The SC component it typically configured to provide the surface onto which it is applied a degree of roughness that may be in a macro and/or nano scale. In the context of the present disclosure, a material applied to the surface of the substrate to provide a degree of roughness in the nano-scale is referred to as the "nano-structuring agent", and a material applied to the surface of the substrate to provide a degree of roughness in the macro scale is referred to as the "micro-structuring agent". The self cleaning component may comprise a nano-structuring agent, a micro-structuring agent as well as a combination of same.

The nano-structuring agent may be selected, without being limited thereto, from the group consisting of hydrophobic-functionalized polyhedral oligomeric silsesquioxane (POSS) compounds. Each POSS molecule may contain multi (1-8) covalently bonded functionalities. POSS functionalities include, without being limited thereto, alcohols and phenols, alkoxysilanes, amines, chlorosilanes, halides, acrylates and methacrylates, epoxides, esters, nitriles, olefins, phosphines, silanes, silanols, thiols and fluorinated POSS. Preferably fluoro-functionalized POSS (FPOSS) is utilized to provide both nanoroughness and hydrophobic surface chemistry. Most preferably POSS with long pendant fluoroalkyl chains are used. The nano-structuring agent may also comprise fluorosilane, fluoroalkylsilane, alkylsilane, and the like known to provide ultra/super hydrophobic properties.

Care should be given so that the SC layer does not block light from reaching the antireflective layer. In other words, that the SC layer remains transparent to the spectrum of interest after being applied onto the ARC layer. Typically, transparency is preserved Without being limited thereto, the micro-structuring agent may be a silica based substance selected from colloidal silica, precipitated silica, unprecipitated silica, hydrophilic fumed silica, hydrophobic fumed silica, colloidal silica, treated colloidal silica, silicate, or treated silicate or any modification or combination thereof. The micro-structuring agent may also be selected from PTFE micropowder, metal nanopowder, metal oxide, inorganic nanopowder, oxide, sulfide, nanoclay, hyperbranched polymer or bohemite or any modification or combination thereof. The microstructuring agent typically has a particle or agglomerate size ranging from 0.1 to 100 microns, typically from 0.1 to 50 microns. It is preferable to select micro-structuring agents that essentially do not absorb light in the spectral region that is desired to be transmitted.

The ARC component and the SCC component are applied in combination onto the substrate's surface. The combination may be of various configurations, such as those illustrated in FIGS. 1A-1C.

Figure 1B:
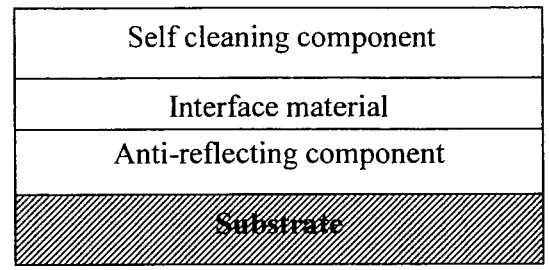
Figure 1C:
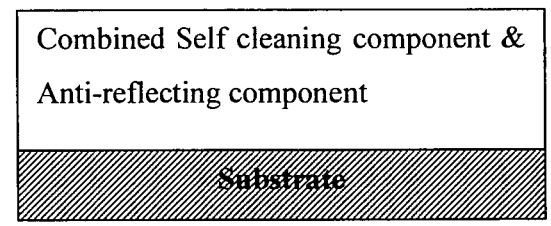

In accordance with one embodiment, the ARC component and the SCC component are laminated one on top of the other to form a bilayer ARC+SCC (FIG. 1A). To this end, the substrate is coated with a first coating layer comprising the ARC component, onto which a second layer comprising the SC component is applied. The bilayer coating configuration may be regarded as a sandwich configuration where an AR layer is sandwiched between in the interface between the substrate and the SCC.

The dual coating of the invention may also comprise a triple layer configuration, referred to as the trilayer coating. According to this embodiment, the interface between the ARC and the SCC may comprise laminate of an interface material that essentially does not reduce transparency of the coating, and does not increase the sliding angle above 10°. The interface material may be a primer, e.g. to facilitate tight contact between the AR and SCCs. The tight contact between the ARC component and the SCC component facilitated by the interface material may be facilitated by covalent bonding as well as by non-covalent interactions. Non-limiting examples of an interface material that can be sandwiched between the ARC component and the SCC component include, silane coupling agents.

According to yet another embodiment, a single layer configuration of coating is used, where a mixture of the ARC component and the SCC component are intimately mixed prior to application onto the substrate such that a single layer coating of homogeneously disperse AR component and SC component is obtained.

It is noted that in any one of the above configurations, the SCC component may comprise a nano-structuring agent, a micro-structuring agent as well as combinations of same, as discussed above.

The dual coating may be prepared in one or more coating stages. Coating techniques are well known in the art and may include, without being limited thereto, spin coating, spraying, spreading, immersing, dipping (i.e. immersion for a short period of time, typically, several seconds), and chemical vapor deposition. The technique used for coating of the AR component and the SC component may be the same or different, depending on various parameters, such as the desired width of the coating layer, type of adhesion between the layers, the existence and type of an interface layer, etc. One preferred embodiment comprises dipping the substrate in a container comprising a liquid of the ARC component. The liquid may be sonicated during the dipping of the substrate therein.

According to one embodiment, the substrate's surface is first coated with an ARC component (which may provide a single as well as multilayer ARC). Coating may be achieved by first dissolving the ingredients forming the ARC component in a suitable solvent system, to form an AR solution, and then applying the AR solution onto the substrate by any suitable application technique.

According to one embodiment, coating is achieved by dipping, once or more, the substrate in a container comprising the AR solution. When coating involves sequential dipping of the substrate, it is preferable that a time interval of at least several minutes be provided between each dipping, so as to allow the applied coating to cure in place and dry.

Once reached the desired thickness for the ARC, the AR coated substrate is manipulated so as to increase its surface roughness. To this end, the AR coated substrate may be etched, e.g. by chemically treating it with a solution of a strong acid. According to one embodiment, etching is obtained by treating (for several minutes) the AR coated surface with a solution of HF in ethanol and washing the same thereafter with water. Drying after the chemical treatment is preferable. Once coating with the AR component is completed, the SCC layer is applied. At times, prior to application of the SC component, conditioning of the surface of the ARC layer may take place. The conditioning may include any treatment that removes undesired residual matter on the ARC (e.g. HF residues from the process of coating the substrate with the ARC component) that may interfere with the tight interaction between the AR and SC components According to one embodiment the conditioning comprises washing the ARC with an organic solvent. The washing can take place by spraying the solvent on the surface of the ARC, by dipping the AR-coated substrate once or more in one or more solvents (e.g. dipping in a solvent mixture or sequential dipping in different solvents). In one embodiment, the conditioning solvent is a polar protic solvent, such as an alcohol. Non-limiting examples of alcohols that can be used for the conditioning of the ARC are methanol, ethanol, propanol, butanol or glycol. A particular example for a solvent used in the context of the invention is ethanol.

Following conditioning, the AR-coated substrate is typically dried prior to the application of the SCC component or the interface material coating (e.g. the primer). Drying may include, without being limited thereto, heating in an enclosed compartment (e.g. an oven). Heating is typically at a temperature higher than the boiling temperature of solvents or other volatile substances present in the ARC, the removal of which from the coating layer is desired. Such volatile substances may include solvents used during the ARC, conditioning solvents etc. Typically, the heating temperature will be at least 30 degrees higher than the boiling temperature of the solvent (s) or said other volatile substances. The heating may be for several minutes, several hours and even more. Drying may also be facilitated by the use of a stream of dry air (blowing of hot air) or heating under vacuum.

The SCC component is applied onto the dry (and preferably cooled to about room temperature surface of the ARC by any of the aforementioned techniques. In one embodiment, the SCC layer is obtained by dipping the AR coated substrate in a suitable SC solution, wherein the SCC ingredients are dispersed in a suitable solvent system. The SC solution may comprise the nano-structuring agent, the micro-structuring agent, or a mixture of same, dispersed in a suitable solvent system compatible with both agents (i.e. capable of homogeneously dispersing the nano and micro structuring agents). According to one embodiment, the AR coated substrate is first coated with a micro-structuring agent to form a micro-structured sub-layer of the SCC component which is then coated with a nano-structured sub-layer of the SCC component. The ratio between the micro-structuring agent and the nano-structuring agent may vary and various other parameters, as well as the ratio in thickness of the resulting sub-layers of the SCC, these being dependent, inter alia, on the type of agents used, the application etc.

The SCC process may include a single dipping as well as a sequence of several dipping sessions. Each dipping may take from a few seconds to few minutes, with a time interval between each dipping of at least about several seconds to at least about several minutes. The number of dipping sessions and the duration of each will dictate the thickness of the thus formed SCC.

Once the SCC process is completed, the dual, AR+SC coated substrate is allowed to dry. In one embodiment, the drying takes place for several hours (even up to 24 hours) in a controlled environment, preferably set at 25° C. with a relative humidity of 60%.

The resulting AR+SC coated substrate is characterized by at least one of the following parameters:
 Contact angle of between 130° to 170°, preferably at least 150°
 Sliding angle of between 0.1° and 20°, preferably at most 10°
 Transmittance of between 94% to 100% of at least a single wavelength of an incident beam, preferably at least 96%, 98% and even at least 99%.

The invention has been described in an illustrative manner, and it is to be understood that the terminology which has been used is intended to be in the nature of words of description rather than of limitation. Obviously, many modifications and variations of the present invention are possible in light of the above teaching. It is therefore, to be understood that within the scope of the appended claims, the invention may be practiced otherwise than as specifically described hereinbelow.

The invention will now be described by way of non-limiting examples. It is to be understood that these should not be construed in any way to limit the scope of the invention.

DESCRIPTION OF NON-LIMITING EXAMPLES

Preparing Sol-Gel Type AR Solution
For preparing a sol-gel solution tetraethylorthosilicate (TEOS, 50 ml) was dissolved in ethanol (300 ml). 25 ml of 10% nitric acid in deionized water (DW) was added to the mixture. The mixture was then and stirred for about 1 hour, at a controlled temperature set at 20° C. The solution was then filtered and to the filtrate 2.5 ml of 40% HF were added. until the desired viscosity was obtained (above about 2.5-2.6 cP).

Coating of a Substrate with the Sol-Gel Type AR Solution
A glass substrate was coated by dipping in the AR solution prepared as described above. The dipping in the AR solution took place 30 minutes after HF was added to the TEOS/HNO$_3$ mixture (i.e. (30 min. after polymerization was initiated by the HF) and lasted not more than a few seconds. The coated substrate was dried for 1 hour at a temperature of 40° C.

To obtain a degree of surface roughness, the AR coated glass was chemically treated with HF (0.25% in ethanol) for about 15 min then washed with distilled water at least once, and dried at 150° C. for 30 min in an oven Visual eye inspection confirmed that the coating had anti-reflecting properties (as commonly practiced, the formation of an anti-reflective layer can be verified by the appearance of a spaced colored fringes on the substrate, when viewed in front of the light).

Conditioning the Anti-Reflecting Coated Substrate
At times, substrates coated with the thin porous film of the ARC layer prepared as described above was washed three times with ethanol. Without being bound thereto, it is believed that the washing of the AR coated substrate with a polar protic solvent improved the properties of the resulting ARC+SCC, as will be shown in the results below. Without being bound by theory one possible reason for an improvement in the properties of the ARC+SCC coated glass may be that the washing with the polar protic solvent removes from the surface of the AR layer undesirable trace amounts of HF.

Preparing the SCC Solution
Two SCC basic solutions were prepared:
 Nano-structuring SCC solution comprising nano-structuring agent;
 Micro-structuring SCC solution comprising micro-structuring agent.

The nano-structuring agent was fluorosilane; the micro-structuring agent was colloidal silica.

In the following experiments, the ARC substrate was coated either with fluorosilane or with a mixture of fluorosilane and colloidal silica. In each case, the ARC glass was dipped into the solution and then dried in an oven for 30 hours.

The fluorosilane solution was prepared by dissolving 1-3% of fluorosilane in a solvent system comprising 90% ethanol and 10% water. The solution of fluorosilane and colloidal silica was prepared using the same solvent system in which 1-3% of fluorosilane and 1-3% of colloidal silica was added.

Each ARC substrate was then either directly coated with the SCC (i.e. without conditioning) or onto a conditioned ARC substrate, as described above. Coating was obtained by dipping the ARC substrate unconditioned or conditioned) in the respective SCC solution, and then drying in an over for 30 min (120° C.).

Analysis
The static contact angle was measured according to the sessile drop method using a commercial video based, software controlled, contact angle analyzer (OCA 20, Dataphysics Instruments GmbH, Germany). Deionized and ultra-filtered water (0.2 μm filter) was used for the measurements. In a preliminary step, it was found that there were no significant changes in the contact angle as a function of drop volume in the range of drop volumes used (1 μl to 30 μl). For contact angle characterization a 5 μl water drop was used. The sliding angle was measured using a tilting unit (TBU90E, Dataphysics Instruments GmbH, Germany) incorporated into the contact angle analyzer. A drop was first deposited on the horizontal substrate and after equilibrium the substrate plane was tilted at a rate of 100°/min until the onset of drop motion. The sliding angle was found to vary with drop volume and was measured as a function of water drop volume. For sliding angle characterization a 30 μl drop was used. The contact angles and sliding angles were measured using video-based software (SCA 20, Dataphysics Instruments GmbH, Germany).

Table 1 provides the results obtained for an ARC substrate (with no SCC, Sample 1) and an ARC substrate coated with the two indicated types of SCC (Samples 2 and 3).

TABLE 1

|  |  | Unconditioned | | Conditioned | | |
| --- | --- | --- | --- | --- | --- | --- |
| No. | Sample description | Contact angle | Sliding angle | Contact angle | Sliding angle | Optical properties |
| 1. | ARC only | 41 | >90 | 31 | >90 | Transparent |
| 2. | ARC + layer of fluorosilane | 34 | >90 | nd | nd | Transparent |
| 3. | ARC + combined layer of fluorosilane + colloidal silica | 129 | >90 | >150 | 10 | Translucent | nd = not determined

As shown in the Table, the unconditioned Sample 1 had a contact and sliding angles of 41° and >90°, respectively. Thus, this coating could not be categorized as a self cleaning surface, which requires a contact angle bigger than 150° and a sliding angle smaller than 10°.

Samples 2-3 contained a dual coating, namely, an ARC layer comprising a sol-gel based silica material and an SCC layer comprising either only fluorosilane (Sample 2) or comprising fluorosilane mixed with colloidal silica (Sample 3).

The results show that conditioning of the ARC substrate prior to coating with SCC resulted in a contact angle greater than 150° and a sliding angle of not more than 10°, thus having both an optimum anti-reflecting property and the self cleaning property.

Without being bound by theory, it was thus envisaged that it is possible to obtain a substrate having anti reflective properties and self cleaning properties.

Further, it appears that in order to improve ARC and SCC properties of a substrate having an ARC and SCC, prior to the coating with the SCC, the ARC substrate requires a conditioning step. The improvement in the ARC and SCC properties may be as a result of the removal of traces of HF (by the washing the ARC).

The invention claimed is:

1. A substrate, comprising:
    a surface being at least partially laminated with a multi-layer coating,
        the multi-layer coating comprising a first layer proximal to the surface and at least one additional layer,
        the first layer being disposed between the surface and the at least one additional layer, the first layer comprising an anti-reflecting coating (ARC) component that comprises silica,
        the at least one additional layer comprising a self-cleaning coating (SCC) component, the SCC component comprising a mixture of nano-structuring agent and micro-structuring agent, the nano-structuring agent comprising fluorosilane and the micro-structuring agent comprising colloidal silica,
    the coating having low refraction, a contact angle of at least 150°, and a sliding angle of at most 10°.

2. A method for applying a coating on a substrate, comprising:
    dipping the substrate at least once in a first coating solution comprising an anti-reflecting coating (ARC) component that comprises and allowing the ARC component to dry so as to form an anti-reflecting substrate; and
    dipping the anti-reflecting substrate at least once in a second coating solution comprising a self-cleaning coating (SCC) component and allowing the SCC component to dry, the SCC component comprising a mixture of nano-structuring agent and micro-structuring agent, the nano-structuring agent comprising fluorosilane and the micro-structuring agent comprising colloidal silica,
    wherein, after the applying, the substrate obtained comprises a surface at least partially laminated with an anti-reflecting (AR), self-cleaning (SC) coating.

3. The method of claim 2, comprising washing the AR substrate at least once with a polar protic solvent prior to dipping the substrate at least once in the second coating solution.

4. The method of claim 2, wherein the polar protic solvent is ethanol.

5. The method of claim 2, further comprising applying an interface material onto the AR coating prior to dipping the substrate at least once in the second coating solution.

6. The method of claim 5, wherein applying the interface material comprises dipping, spraying or spreading the interface material onto the AR coating and allowing the material to dry.

7. The method of claim 5, wherein the interface material is a silane coupling agent.

8. The substrate of claim 1, having a light transmission of at least 80%.

9. The substrate of claim 1, wherein the SCC component comprises an essentially homogenous dispersion of the nano-structuring agent over a matrix formed by the micro-structuring agent.

* * * * *